United States Patent [19]

Nishiyama et al.

[11] Patent Number: 4,905,206

[45] Date of Patent: Feb. 27, 1990

[54] ULTRASONIC DOPPLER FLOW METER

[75] Inventors: Hisashi Nishiyama; Kageyoshi Katakura; Toshio Ogawa, all of Tokyo; Satoshi Tamano; Koji Tanabe, both of Kashiwa; Shizuo Ishikawa, Kanagawa, all of Japan

[73] Assignee: Hitachi Medical Corporation, Tokyo, Japan

[21] Appl. No.: 369,656

[22] Filed: Jun. 20, 1989

[30] Foreign Application Priority Data

Jun. 22, 1988 [JP] Japan ................................ 63-153850
Aug. 4, 1988 [JP] Japan ................................ 63-195038
Aug. 26, 1988 [JP] Japan ................................ 63-210757
Aug. 26, 1988 [JP] Japan ................................ 63-210758

[51] Int. Cl.$^4$ .............................................. G01F 1/66
[52] U.S. Cl. ................................. 367/90; 128/661.09; 73/861.25
[58] Field of Search .................... 367/90; 128/661.01, 128/661.08, 661.09; 73/861.25

[56] References Cited

U.S. PATENT DOCUMENTS 4,751,847 6/1988 Katakura et al. ................ 73/861.25

Primary Examiner—Thomas H. Tarcza
Assistant Examiner—Daniel T. Pihulic
Attorney, Agent, or Firm—Antonelli, Terry & Wands

[57] ABSTRACT

A flow meter, in which pulsed continuous ultrasonic wave is transmitted towards an object at predetermined intervals T to obtain a phase vector from a reception signal of wave reflected by the object and which calculates a Doppler frequency from the average value of phase differences between phase vectors at the sampling interval T to obtain a signal indicating the speed of the object, comprising a phase difference calculator by the auto-correlation method, by which a plurality of phase difference vectors indicating phase differences between phase vectors are added, the argument of the sum vector thus obtained representing the average phase difference, or a phase difference calculator by the 2-axial-component method, by which a phase difference is divided into 2 axial components, a cosine value and a sine value, and the average phase difference is obtained by using the average value for each of the components, and a phase difference calculator by the phase difference averaging calculator, by which a plurality of phase differences are added, as they are, to obtain the average thereof, in order to obtain a phase difference average value having small errors by switching them.

19 Claims, 16 Drawing Sheets

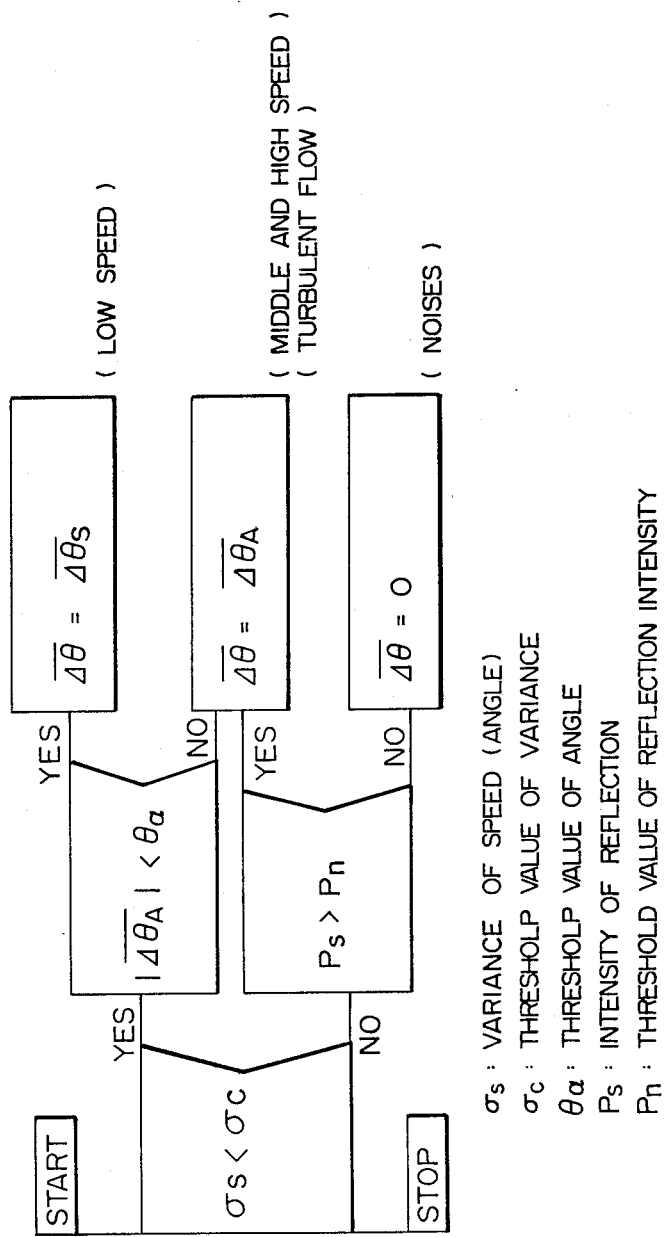

FIG. 10A ($\overline{\Delta\theta}_T > \frac{\pi}{2}$)

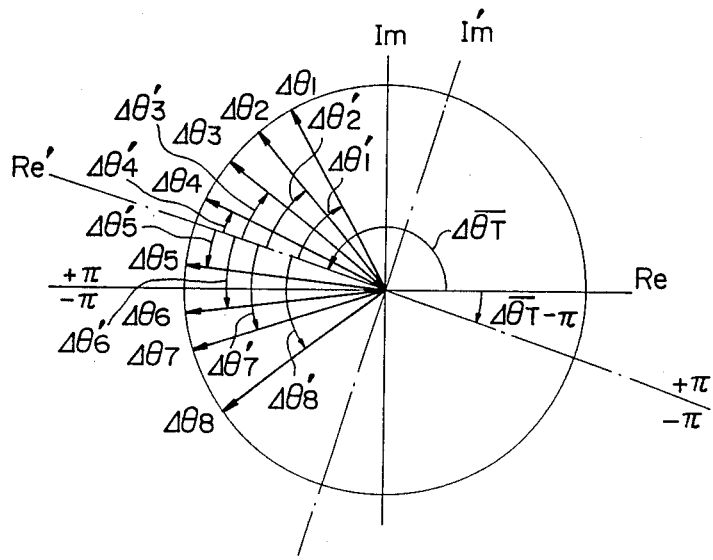

$$\Delta\theta_1' = \overline{\Delta\theta}_T - \Delta\theta_1$$

$$\Delta\theta_2' = \overline{\Delta\theta}_T - \Delta\theta_2$$

$$\Delta\theta_3' = \overline{\Delta\theta}_T - \Delta\theta_3$$

$$\Delta\theta_4' = \overline{\Delta\theta}_T - \Delta\theta_4$$

$$\Delta\theta_5' = \overline{\Delta\theta}_T - \Delta\theta_5$$

$$\Delta\theta_6' = \overline{\Delta\theta}_T - \Delta\theta_6 - 2\pi$$

$$\Delta\theta_7' = \overline{\Delta\theta}_T - \Delta\theta_7 - 2\pi$$

$$\Delta\theta_8' = \overline{\Delta\theta}_T - \Delta\theta_8 - 2\pi$$

FIG. 10B ($\overline{\Delta\theta}_T < \frac{\pi}{2}$)

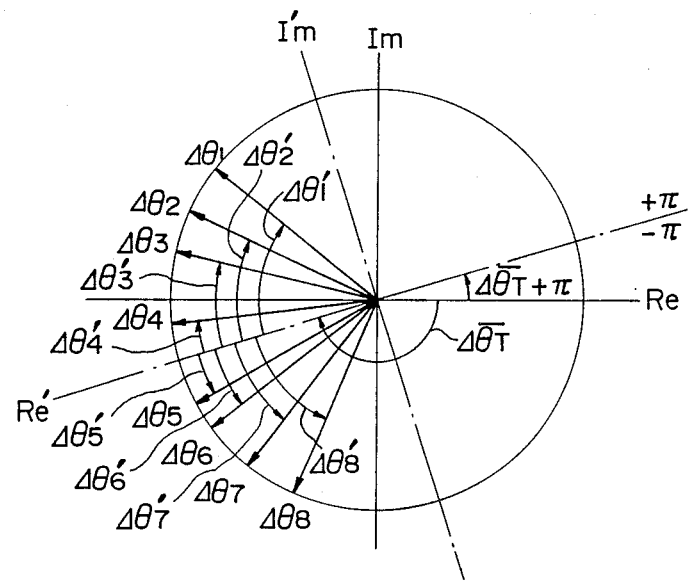

$\Delta\theta_1' = \overline{\Delta\theta}_T - \Delta\theta_1 + 2\pi$ $\Delta\theta_2' = \overline{\Delta\theta}_T - \Delta\theta_2 + 2\pi$ $\Delta\theta_3' = \overline{\Delta\theta}_T - \Delta\theta_3 + 2\pi$ $\Delta\theta_4' = \overline{\Delta\theta}_T - \Delta\theta_4$ $\Delta\theta_5' = \overline{\Delta\theta}_T - \Delta\theta_5$ $\Delta\theta_6' = \overline{\Delta\theta}_T - \Delta\theta_6$ $\Delta\theta_7' = \overline{\Delta\theta}_T - \Delta\theta_7$ $\Delta\theta_8' = \overline{\Delta\theta}_T - \Delta\theta_8$

ULTRASONIC DOPPLER FLOW METER

BACKGROUND OF THE INVENTION

This invention relates to a pulse Doppler measuring apparatus and in particular to an apparatus for measuring the velocity of an object by using ultrasonic wave, e.g. a pulse Doppler measuring apparatus capable of measuring it with a high signal to noise ratio, in the case where the blood flow speed in a living body is measured in real time.

Heretofore various sorts of apparatuses are known for measuring the flow speed of an object by using the Doppler effect of acoustic wave. In particular, in an apparatus using the pulse Doppler method (cf. e.g. D. W. Baker; Pulsed Ultrasonic Doppler Blood Flow Sensing; IEEE Trans: Sonics and Ultrasonics; vol. SU-17, No. 3 July 1970, pp. 170–185), it is known that it is possible to identify a measured part by transmitting a pulsed continuous wave and setting a time gate corresponding to the distance to the measured part on the received signal.

As prior art ultrasonic Doppler blood flow measuring apparatuses, as disclosed in e.g. JP-A-No. 58-188433, JP-A-No. 60-119929 and JP-A-No. 61-25527, there are known apparatuses for measuring blood flow by transmitting ultrasonic wave towards blood vessel and measuring the Doppler shift frequency of the ultrasonic wave reflected by the blood in the blood vessel to obtain $v\cos\theta$, where $\theta$ represents the angle between the direction of the blood flow and the transmission direction of the ultrasonic wave and $v$ indicates the blood flow speed.

Further techniques, by which distribution of the blood flow speed in a certain cross-section in a living body is measured and displayed in color on a tomographic image, called color flow mapping, are disclosed in C. KASAI et al; Real-Time Two-Dimmensional Blood Flow Imaging Using an Autocorrelation Technique; IEEE Trans. Sonics and Ultrasonics, vol. SU32, No. 3, May 1985, pp. 458–464. For effecting this color flow mapping, in order to achieve a desired image frame rate, the blood flow speed at each of pixels is obtained by averaging measured values of the Doppler shift of a relatively small number of measurements. In the example described above, the auto-correlation method is used, by which a difference vector is obtained, each repeated measurement, by means of a auto-correlator between a vector indicated by a Doppler signal detected currently and a vector indicated by a Doppler signal detected the last time and the average speed is calculated by using the argument of a vector representing the sum of a plurality of difference vectors.

On the other hand, in U.S. patent application Ser. No. 101,444, filed Sept. 28, 1987, copending with this application, is disclosed a method, called 2-axial-component method, by which measurements being repeated, a phase difference $\Delta\theta$ of the Doppler signal is obtained for every measurement, which difference is decomposed into a cosine component and a sine component; a plurality of values obtained for each of the components are added and averaged; and the phase difference indicated by the averaged cosine and sine components thus obtained is transformed into the velocity.

Furthermore, in 1978 Ultrasonic Symposium Proceedings, pp. 348–352 is disclosed a method, by which a phase difference of the Doppler signal is obtained for every measurement and an averaged phase difference is calculated by adding directly a plurality of values of the phase difference, which averaged phase difference is transformed into the velocity. Hereinbelow this is called phase difference averaging method.

SUMMARY OF THE INVENTION

According to the phase difference averaging method described above, if the phase difference corresponding to the true blood flow speed is close to $\pi$ or $-\pi$, the phase difference detected by each measurement can exceed $\pi$ or $-\pi$ because of variations in the detected phase difference due to noise, which gives rise to a phenomenon that the total sum is at the neighborhood of zero due to aliasing of the value at $\pi$ and $-\pi$. Consequently it has a drawback that the measurement domain at a high speed region is restricted. On the other hand, as results of study of the applicants of this application it was found that the effect to improve the precision by averaging a plurality of measured values by the auto-correlation method or the 2-axial-component method is inferior to that obtained by the phase difference averaging method and further that very great errors in the averaging calculation are produced in a low speed region, where variation in the phase of the Doppler detection signal due to noise is great.

An object of this invention is to provide a pulse Doppler flow meter having a satisfactorily wide measurement domain also in the high speed region and small measurement errors due to noise in the low speed region.

In order to achieve the above object, according to this invention, there are disposed 2 kinds of means for calculating the average phase difference having characteristics basically different from each other. The first of them calculates a first average phase difference corresponding to the Doppler shift by the auto-correlation method or the 2-axial-component method and the second calculates a second average phase difference corresponding to the Doppler shift obtained by the phase difference averaging method. The above object can be achieved by selecting either one of the first and the second average phase difference, depending on the speed region.

Further the above object can be achieved not only by the selection, as described above, but also by obtaining correction values from the output of the first average phase difference calculating means and effecting corrections on the second average phase difference so that the addition and averaging of angles obtained from the second average phase difference is an operation producing no errors in the high speed region.

Still further the above object can be achieved also by constructing the first and the second average phase difference detecting means by two average phase difference detecting means by the auto-correlation method using two different time parameters and selecting one of the output thereof.

The other objects of this invention will be obvious from the following detailed explanation.

Figure 2:
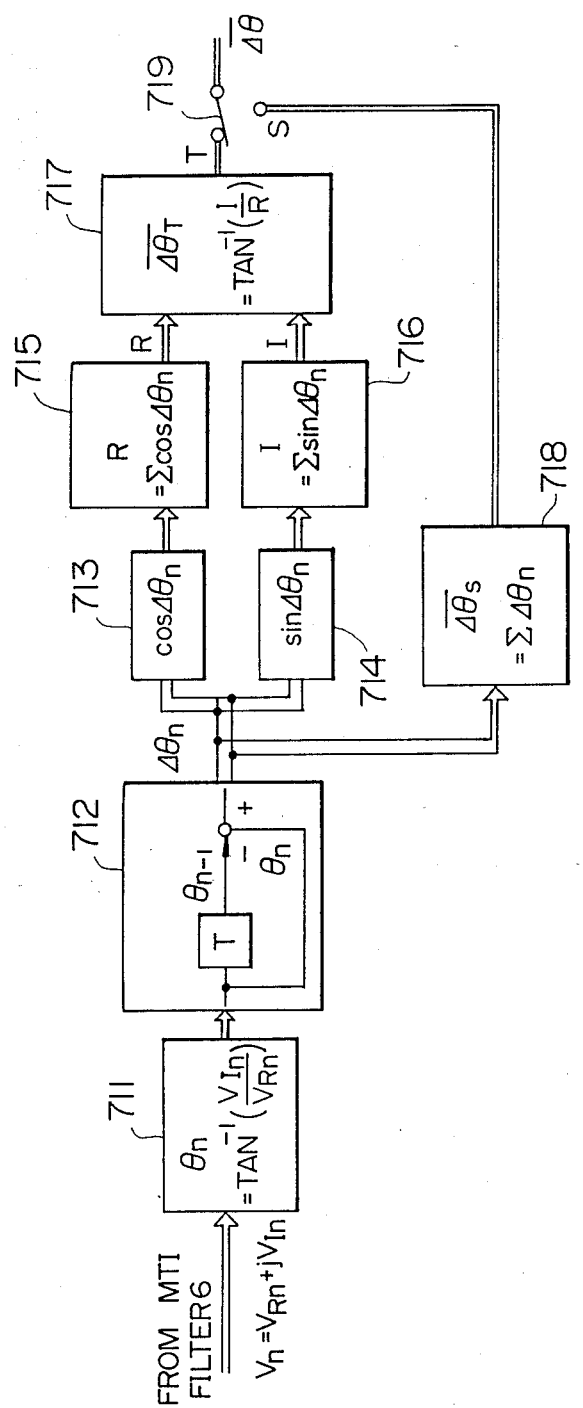
FIGS. 2, 6, 7, 9, 11, 12 and 14 are block diagrams showing different embodiments.
Figure 4:
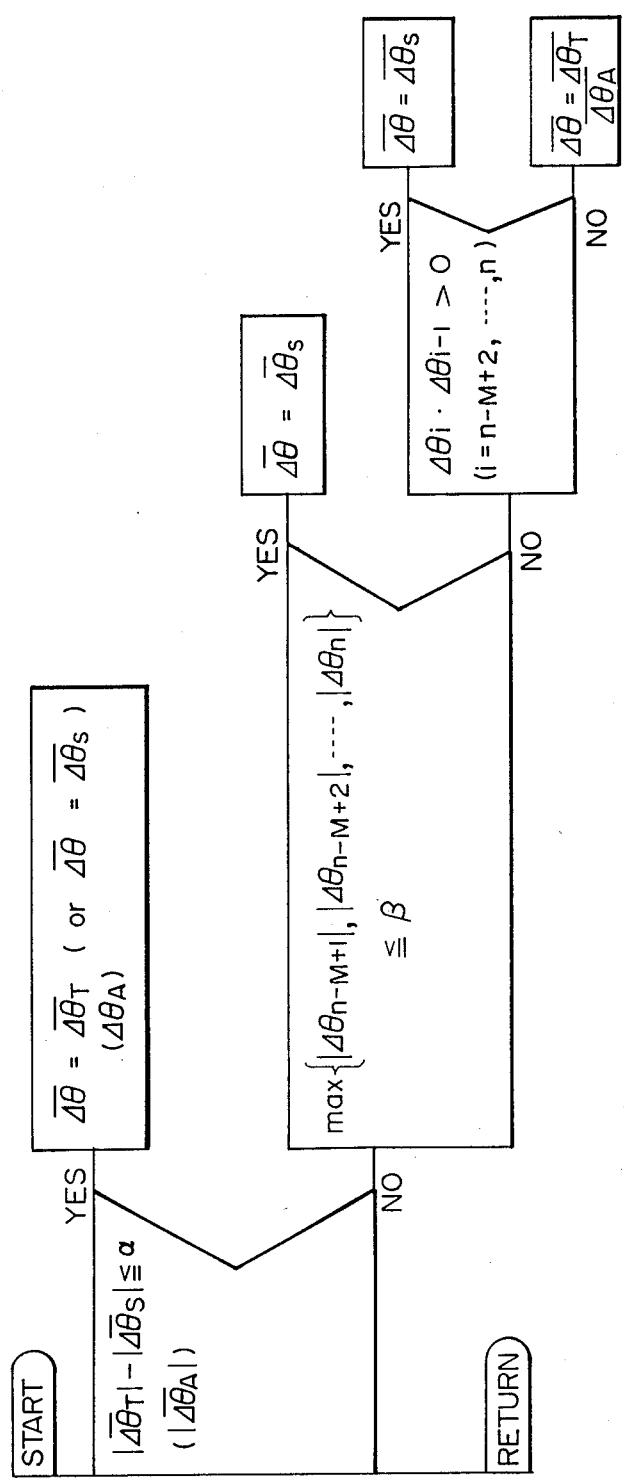
Figure 5:
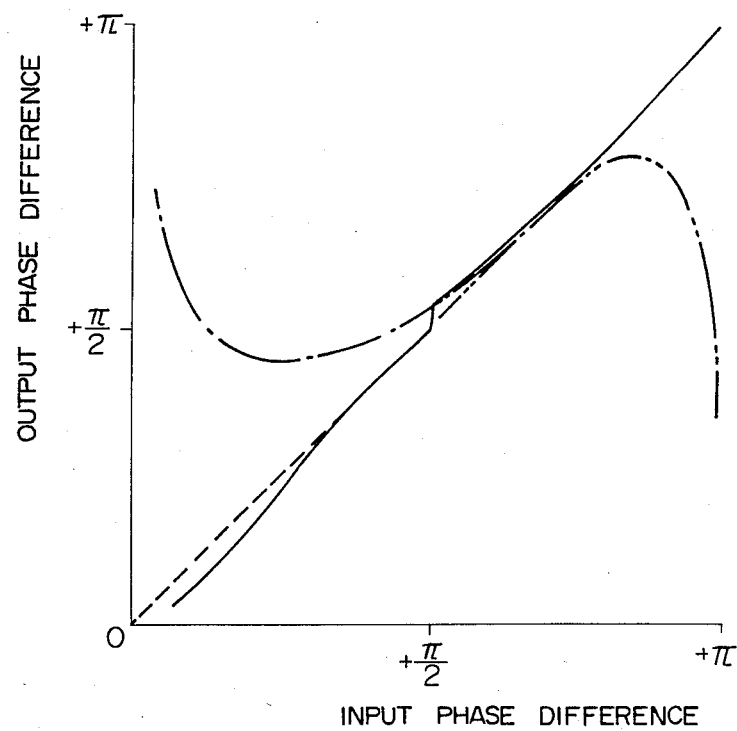
Figure 7:
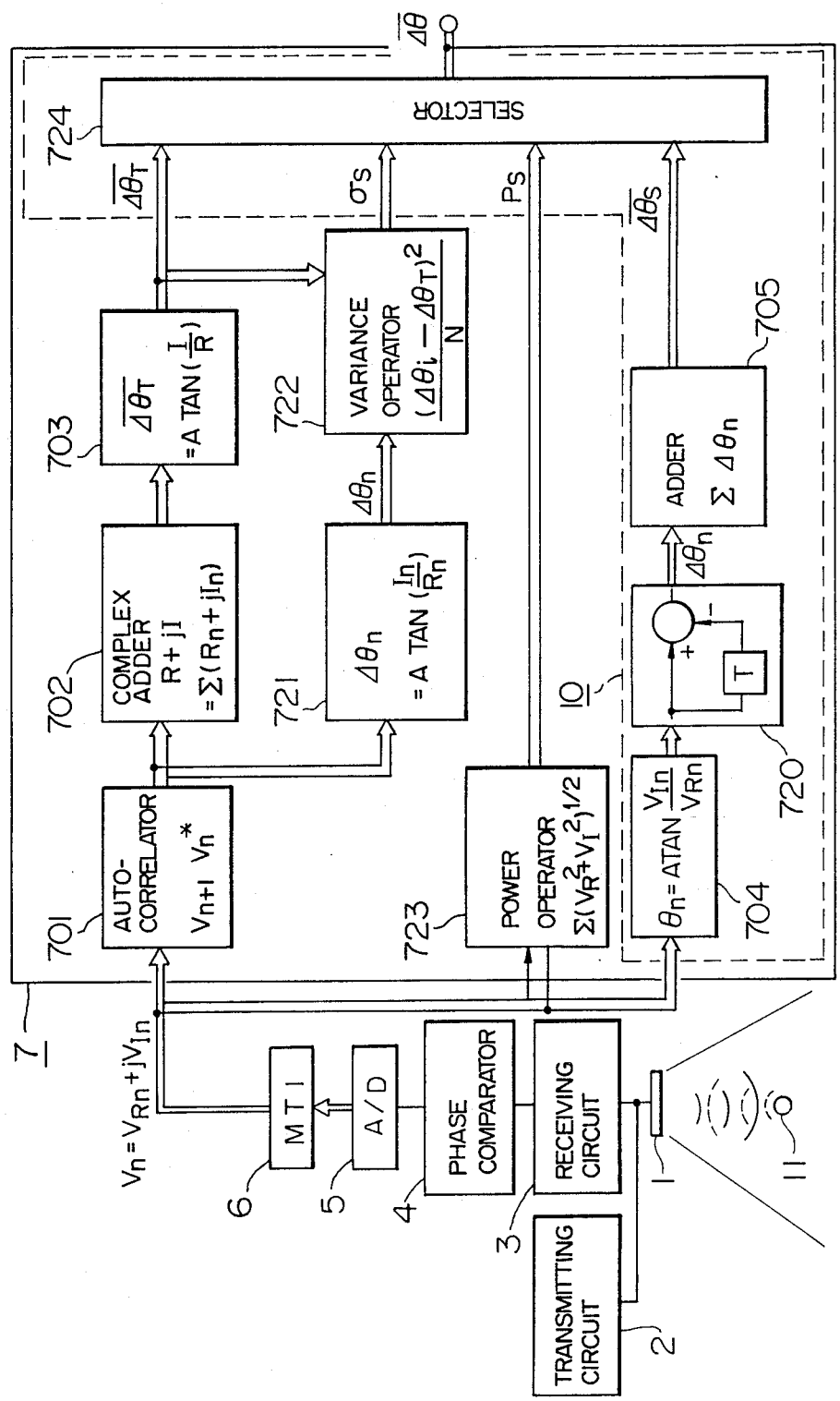
Figure 8B:
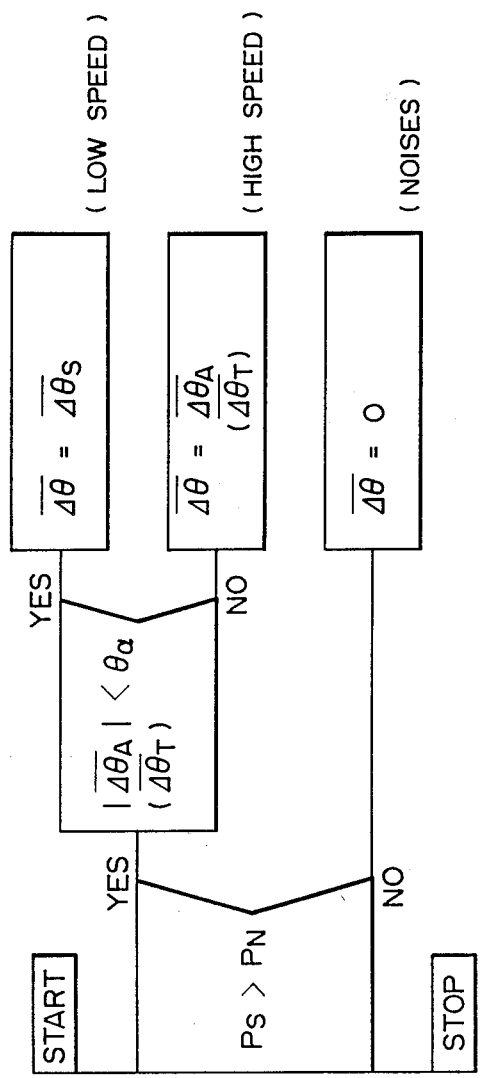
Figure 9:
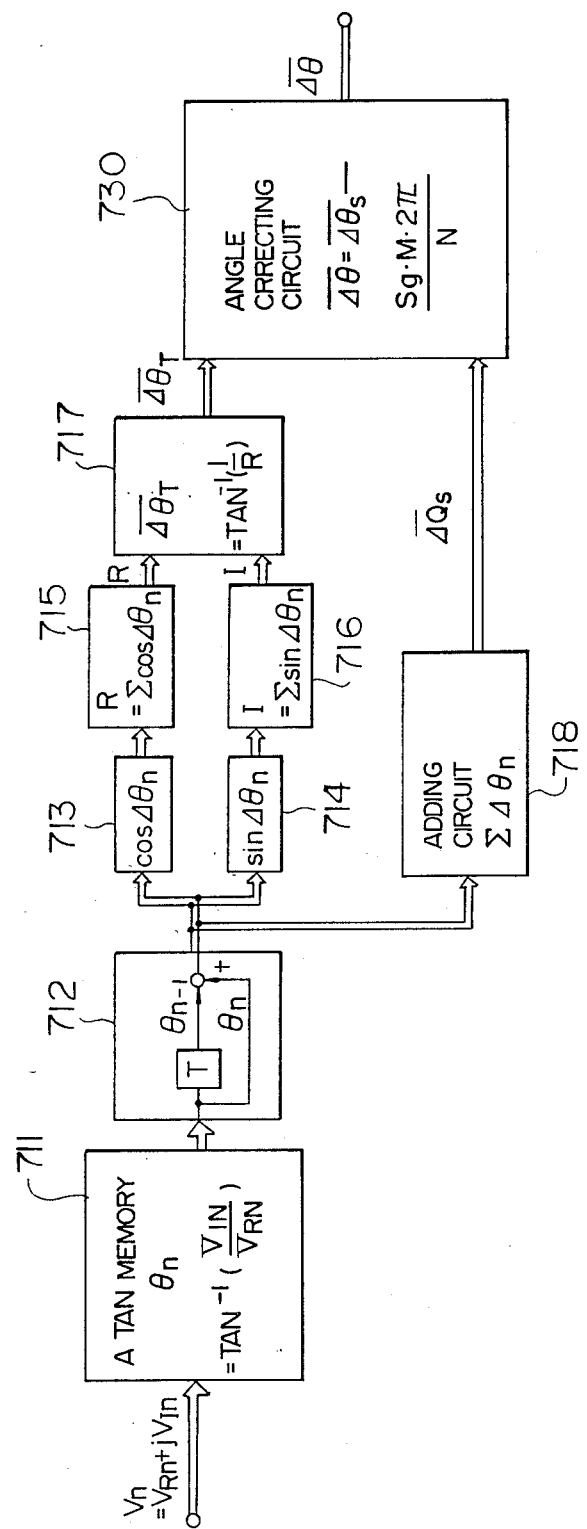
Figure 12:
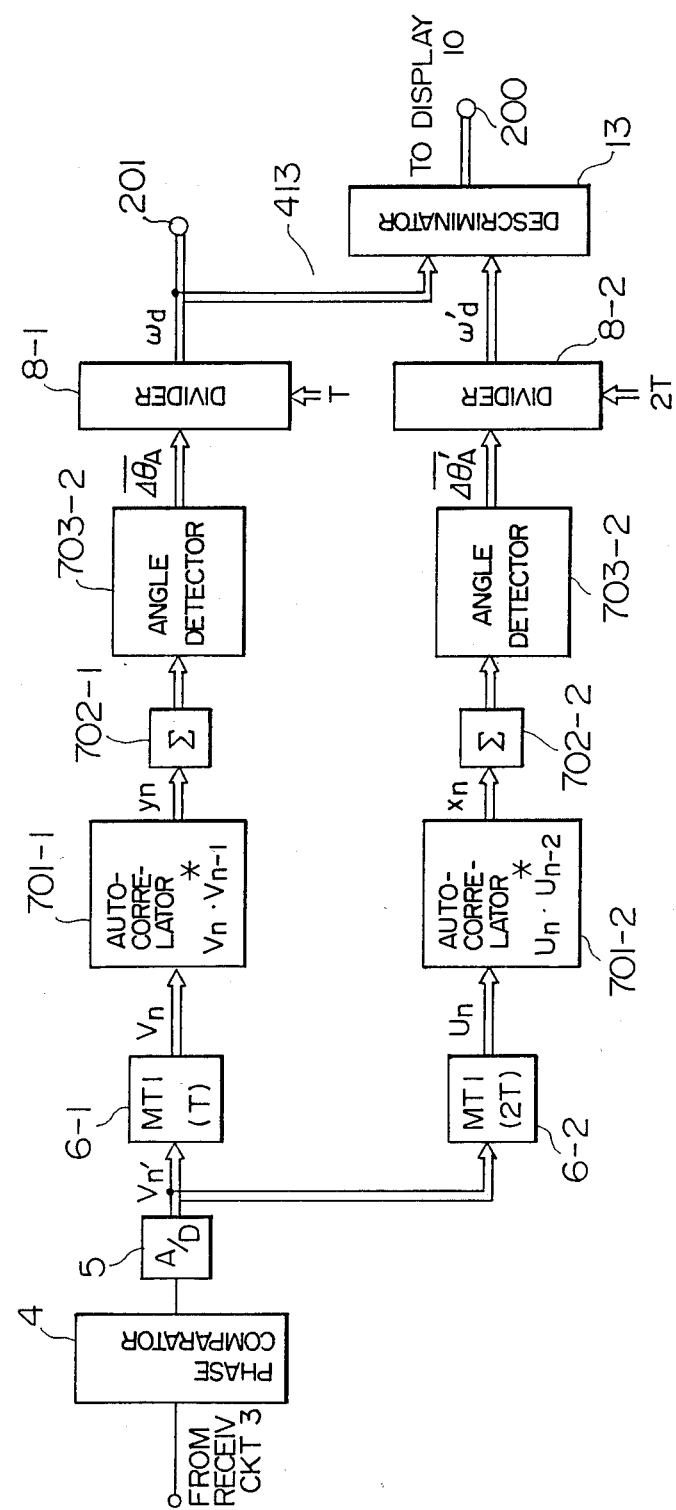
Figure 13:
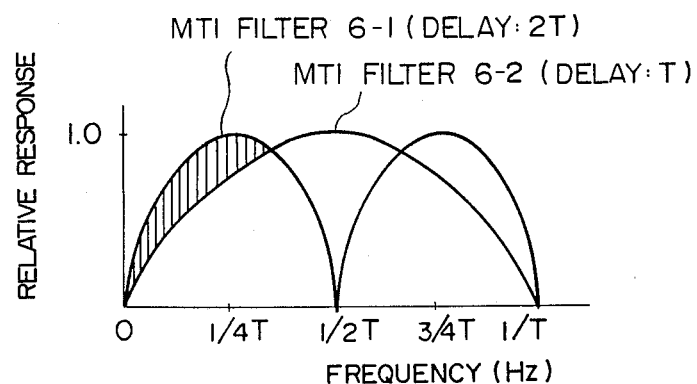

Fi. 3 is a graph indicating in- and output characteristics obtained by two kinds of the average phase difference calculating methods;

FIG. 4 is a PAD flowchart indicating the judging method in FIG. 2;

FIG. 5 is a graph indicating in- and output characteristics in the embodiment indicated in FIG. 2;

FIGS. 8A and 8B are PAD flow charts indicating the judging method in FIG. 7;

FIGS. 10A and 10B are conceptional schemes indicating the operating method in FIG. 9;

FIG. 13 is a graph indicating characteristics of the MTI filter in FIG. 12; and

Figure 15:
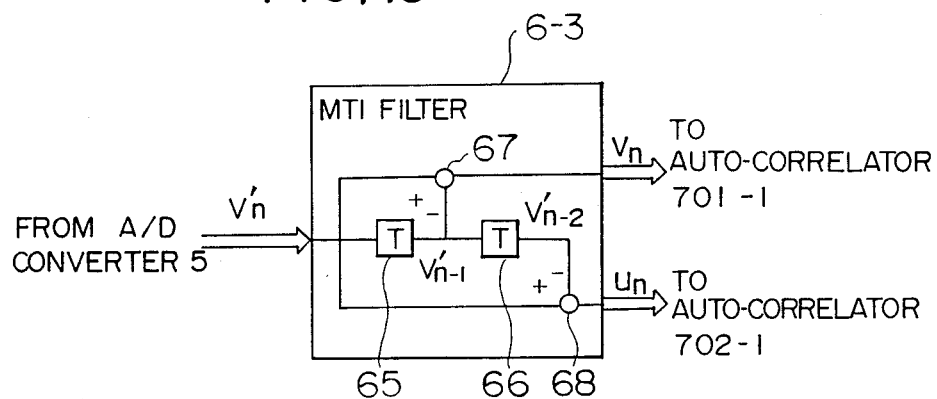

FIG. 15 is a block diagram illustrating another example of the MTI (moving target indicator) filter in FIG. 12.

DESCRIPTION OF THE PREFERRED EMBODIMENTS

Hereinbelow the principle and the preferred embodiments of this invention will be described in detail, referring to the drawings. At first the outline of the construction and the principle of the operation of this invention will be explained.

Figure 1:
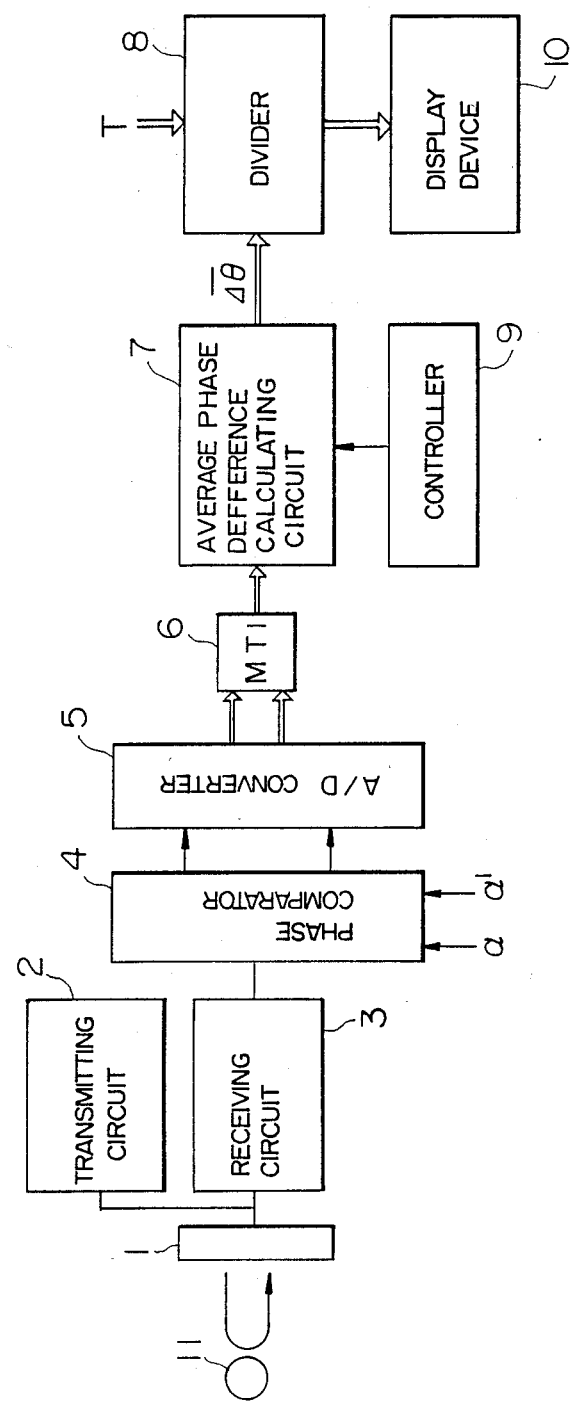
FIG. 1 is a block diagram showing the whole construction of embodiments of this invention.

FIG. 1 is a block diagram of the pulse Doppler device, which is an embodiment of this invention.

The pulse Doppler measuring apparatus according to this invention consists of a transmitting circuit 2, a receiving circuit 3, an A/D converter 4, a phase comparator 5, an MTI filter (fixed substance removing filter) 6, a Doppler average phase difference calculating circuit 7, a divider 8, a controller 9 and a display device 10.

The transmitting circuit 2 gives a transducer 1 a pulsed continuous wave at predetermined periods T. In this way the transducer 1 emits an ultrasonic pulsed continuous wave at the predetermined periods T towards a reflecting body 11. Reflected acoustic wave thus produced returns again to the transducer 1 and reflection signals therefrom are detected one after another by the receiving circuit 3. In the phase comparator 4 the detected received signals are mixed with two kinds of reference signals $\alpha = A \cos \omega t$ and $\alpha' = A \sin \omega_0 t$ and in this way Doppler signal $V_R$ and $V_I$ having phase information of the reflection signals, respectively, are obtained. The A/D converter 5 samples the signals $V_R$ and $V_I$ of the wave reflected by the reflecting body 11 located at a specified depth, converts them into digital signals, at the periods T. The signals thus digitized can be expressed by $V_{Rn}$ and $V_{In}$ represented by the following equation by using n (n=1, 2, 3, ...) indicating the number of repetition of the transmitted wave;

$$\left. \begin{array}{l} V_{Rn} = A_n \cos \theta_n \\ V_{In} = A_n \sin \theta_n \end{array} \right\} \quad (1)$$

The MTI filter 6 forms a first order difference of the output of the A/D converter 5 stated above to remove the unvariable reflected wave signal coming from fixed substance. For the sake of the simplicity, writing Eq. (1) in one equation as follows:

$$V_n' = A_n \exp(j\theta_n) \quad (2)$$

the output of the MTI filter is expressed by $$V_n = V_n' - V_{n-1}' \quad (3)$$

Hereinbelow $V_n$ is called phase vector. The average phase difference calculating circuit 7 has a structure peculiar to this invention and forms the averaged Doppler argument obtained from a plurality of values of the phase vector $V_n$ stated above.

FIG. 2 illustrates an example of the average phase difference calculating circuit 7. A memory 711 has a function to convert data of the 2-axial-component of a vector into an argument. That is, in the memory 711 values of the argument corresponding to a 2-dimensional address, in which values of the x and y components of the vector, are arranged, are stored. The MTI filter gives the address input terminal thereof the imaginary and the real part of the phase vector $V_n$ and the value of $\theta_n = \tan^{-1}(V_{Rn}/V_{In})$ is read out from the memory 712. In the phase difference detector 712 the difference between the argument $\theta_{n-1}$ preceding by one step and the argument $\theta_n$ read out at this time is formed to obtain the phase difference $\Delta \theta_n = \theta_n - \theta_{n-1}$. A memory 713 has a function to convert the angle to the cosine thereof and a memory 714 has a function to convert the angle to the sine thereof. That is, when the phase difference $\Delta \theta_n$ is given as the address input, the value of $\sin \Delta \theta_n$ is read out from the memory 713 and the value of $\cos \Delta \theta_n$ from the memory 714. Adders 715 and 716 add outputs of the memories 713 and 714, respectively, for a predetermined number of times. Typically they add the cosine and the sine for n times, going back from the current values $\cos \Delta \theta_n$ and $\sin \Delta \theta_n$, respectively. That is, the output R of the adder 715 and the output I of the adder 716 are given by:

$$\left. \begin{array}{l} R = \sum_{i=n-N+1}^{n} \cos \Delta \theta_i \\ I = \sum_{i=n-N+1}^{n} \sin \Delta \theta_i \end{array} \right\} \quad (4)$$

The memory 717 has a function together with the memory 712 to convert the data of the 2-axial component of the vector into the argument. When the values of R and I are given as the address input, the phase difference expressed by:

$$\overline{\Delta \theta}_T = \tan^{-1}\left(\frac{R}{I}\right) \quad (5)$$

is obtained from the memory 717. The part described above is a part for obtaining the average phase difference by the 2-axial-component method.

On the other hand, an adder 718 adds outputs $\Delta \theta_i$ of the phase difference detector for a predetermined number of times. Typically, it adds them for N times, going back from the current value $\Delta \theta_n$. The output $\overline{\Delta \theta}_S$ of the adder 718 can be transformed into the average of $\Delta \theta_i$ expressed by the following equation by modifying the meaning of the bit.

$$\overline{\Delta \theta}_S = \frac{1}{N} \sum_{i=n-N+1}^{n} \Delta \theta_i \quad (6)$$

This part is a part for obtaining the average phase difference by the phase difference averaging method.

One of the two average phase differences $\overline{\Delta\theta}_T$ and $\overline{\Delta\theta}_S$ thus obtained is selected by a multiplexer 719. Since the selected average phase difference $\overline{\Delta\theta}$ indicates a Doppler phase shift during the period of time of the wave transmission interval T, it is converted by the divider 8 in FIG. 1 into a Doppler frequency by using the following equation:

$$\omega d = \frac{\overline{\Delta\theta}}{T} \quad (7)$$

Figure 3:
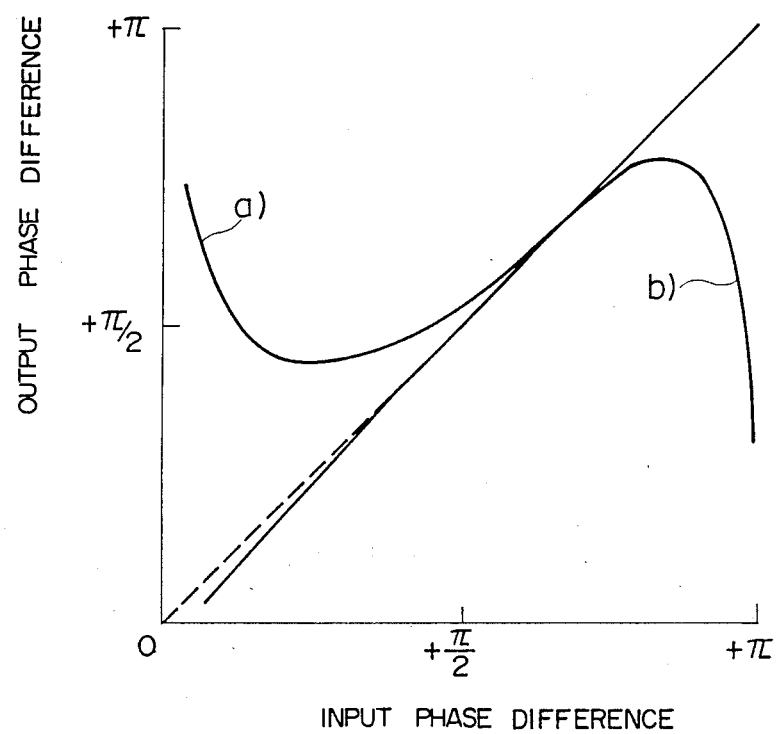

The switching over of $\overline{\Delta\theta}_T$ and $\overline{\Delta\theta}_S$ by the multiplexer 719 stated above is executed by an instruction from the controller 9. The algorithm for the switching over in this embodiment will be explained below, referring to FIGS. 3, 4 and 5. FIG. 3 shows characteristics of the average phase differences obtained by the 2-axial-component method and the phase difference averaging method, in which the abscissa represents the input phase difference corresponding to the real blood flow speed and the ordinate the output phase difference really calculated, and results obtained by simulation is shown. At this time, as a model of the output signal of the phase comparator (block 4 in FIG. 1), which is the Doppler signal, $$X_n = A_n \exp(j\omega_d t) + B_n(W'_n + jW''_n) \quad (8)$$

is used. However, it is supposed here that phase noises $W'_n$ and $W''_n$ are white noises and normal random numbers according to the normal distribution N (0, 1) are used.

$W''_n$ is generated with an initial value of the random number different from that for $W'_n$ and therefore they have no correlation. As factors of the generation of this noises, each variation in the reflected signal due to microscopic variations in the blood flow, acoustic noise produced by non-uniformity in the structure at the propagation process of the acoustic wave, electric noise in amplifiers used for signal amplification in the measuring apparatus, etc. are taken into account. Further $W'_n$ represents noise in the real part and $W''_n$ noise in the imaginary part. $\omega_d$ indicates the Doppler frequency.

The curve indicated by (a) in FIG. 3 indicates characteristics of the phase difference obtained by the 2-axial-component method, i.e. $\overline{\Delta\theta}_T$ stated above. The phase difference between Doppler signals is obtained through the MTI filter and the gain is small for the low speed region because of the characteristics of the MTI filter. That is, in a region where the absolute value of the phase difference is close to O, the amplitude $A_n$ of the true Doppler signal is small and the relative amplitude $B_n$ of the noise component is great. Accordingly, phase difference $\Delta\theta_n$ which are actually obtained through sequential measurements, tend to distribute over the range of $\pm\pi/2$ arround a true average phase difference $\overline{\Delta\theta}$ in this low speed region. Though the average angle of two angles $$\left(\overline{\Delta\theta} + \frac{\pi}{2} + \alpha\right)$$

and $$\left(\overline{\Delta\theta} - \frac{\pi}{2} - \alpha\right)$$

is $\overline{\Delta\theta}$, the output $\overline{\Delta\theta}_T$ of the 2-axial component method when those two angles are given have an error of $\pi$ or $-\pi$ from $\overline{\Delta\theta}$, since the method uses vector summation for averaging. That is why errors becomes greater by the 2-axial component method, as the true phase difference approaches more closely to zero. Further, another averaging method called "autocorrelation method" have a simillar output characteristics to the curve (a) in FIG. 3, since the method also uses vector summation for averaging.

On the other hand, the curve indicated by (b) in FIG. 3 indicates the phase difference obtained by the phase difference averaging method, i.e. characteristics of $\overline{\Delta\theta}_S$ stated above. In the low speed region, even if phase differences of the noise are widely distributed around the phase difference of the true Doppler signal, since noise components are approximately cancelled by averaging the angle itself, errors are small. On the other hand, if the phase difference corresponding to the true blood flow speed is close to $\pi$ or $-\pi$, it happens that each detected phase difference exceeds $\pi$ or $-\pi$ because of variations of the detected phase difference due to the noises. Due to aliasing of the value at $\pi$ and $-\pi$, a phenomenon takes place that the operation result of the addition and the averaging of the angle becomes close to zero. Consequently by the phase difference averaging method remarkable errors take place in the high speed region.

According to the examination of the simulation result and the cause of the errors described above, in this embodiment, the algorithm as indicated in FIG. 4 is adopted and one of $\overline{\Delta\theta}_T$ and $\overline{\Delta\theta}_S$ in FIG. 2 is selected. That is;

(1) a difference between $|\overline{\Delta\theta}_T|$ obtained from the memory 717 and $|\overline{\Delta\theta}_S|$ obtained from the adder 718 is formed and if the value of $|\overline{\Delta\theta}_T| - |\overline{\Delta\theta}_S|$ doesn't exceed a threshold value $\alpha$, the multiplexer 719 is connect on the T side so that the output $\overline{\Delta\theta}_T$ obtained by the 2-axial-component method is selected;

(2) if the value of $|\overline{\Delta\theta}_T| - |\overline{\Delta\theta}_S|$ exceeds $\alpha$, the maximum of the absolute values of N phase differences used for the averaging operation max $\{|\Delta\theta_{n-N+1}|, |\Delta\theta_{n-N+2}|, \ldots |\Delta\theta_n|\}$ is compared with a threshold value $\beta$; and if the maximum value doesn't exceed $\beta$, the multiplexer 719 is connected on the S side so that the output $\overline{\Delta\theta}_S$ obtained by the phase difference averaging method is selected;

(3) if $|\overline{\Delta\theta}\text{hd }T| - |\overline{\Delta\theta}_S| > \alpha$ and the maximum value stated above exceeds $\beta$, it is examined whether all the N phase difference signals have a same sign, and if they have a same sign, i.e. $\Delta\theta_i \cdot \Delta\theta_{i-1} > 0$ is valid for all $i = n-N+2, \ldots, n$, the multiplexer 719 is connected on the S side so that $\overline{\Delta\theta}_S$ is selected; and (4) if $|\overline{\Delta\theta}_T| - |\overline{\Delta\theta}_A| > \alpha$, the maximum value stated above exceeds $\beta$, and the N phase difference signals have different signs, i.e. there is at least one case where $\Delta\theta_i \cdot \Delta\theta_{i-1} > 0$ is not valid, the multiplexer 719 is connected on the T side so that $\overline{\Delta\theta}_T$ is selected.

When one of the average phase difference $\overline{\Delta\theta}_T$ obtained by the 2-axial-component method and the average phase difference $\overline{\Delta\theta}_S$ obtained by the phase difference averaging method is selected according to the algorithm described above, variations in the output phase difference with respect to the input phase difference corresponding to the true blood flow speed can be represented by the full line in FIG. 5. Also in the region where the input phase difference is comprised between 0 to $-\pi$, the characteristics are completely symmetric to those indicated in FIG. 5. Therefore the speed detection can be effected with small errors over all the speed detection region from $-\pi$ to $\pi$. Further, in the case of (1) stated above, since $\overline{\Delta\theta}_S \approx \overline{\Delta\theta}_T$, $\overline{\Delta\theta}_T$ may be selected.

Figure 6:
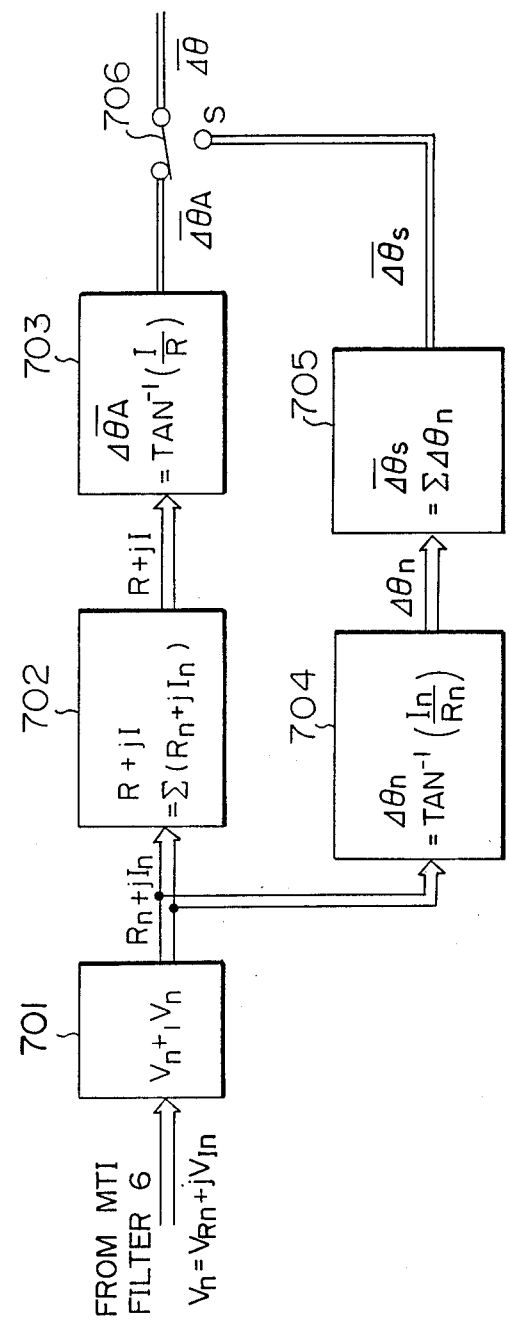

As described previously, since the auto-correlation method has error characteristics completely similar to those of the 2-axial-component method, it is possible to switch over the output phase difference $\overline{\Delta\theta}_A$ by the auto-correlation method and the output phase difference $\overline{\Delta\theta}_S$ by the phase difference averaging method by applying the algorithm indicated in FIG. 4, as it is. FIG. 6 shows an example of the average phase difference calculating circuit 7 indicated in FIG. 1, which executes such a switching.

In FIG. 6, the auto-correlator 701 calculates a complex product of the phase vector $V_n$ at the current time point given through the MTI filter 6 indicated in FIG. 1 by $V_{n-1}^*$, which is the conjugate complex vector of the phase vector $V_{n-1}$ at the time preceding by 1 period. The result $Y_n$ thus obtained is a vector having an argument indicating the phase difference between $V_n$ and $V_{n-1}$, which is expressed by:

$$Y_n = V_n \cdot V_{n-1}^* \qquad (9)$$
$$= R_n + jI_n$$

A complex adder 702 adds $Y_n = R_n + jI_n$, which is outputs of the phase difference detector 701, an arbitrary number of times. Typically, going back from $Y_n$ which is the current time point, N vectors are added. The obtained sum vector is represented by:

$$R + jI = \sum_{i=n-N+1}^{n} (R_i + jI_i) \qquad (10)$$

A memory 703 is one, in which arguments are stored, using 2-axial components as addresses, similarly to the memory 717 described, referring to FIG. 2. When the values of R and I described above are given to the memory 702, a corresponding argument $\overline{\Delta\theta}_T = \tan^{-1}(I/R)$ is read out. The value of this $\overline{\Delta\theta}_T$ is the average phase difference by the auto-correlation method. On the other hand the real part $R_n$ and the imaginary part $I_n$ of the output $Y_n$ of the auto-correlator 701 described above are given to a memory 704, in which arguments are stored similarly, using 2-axial components as addresses and in this way the argument $\Delta\theta_n = \tan^{-1}(I_n/R_n)$ of the phase difference vector is read out from the memory 704. An adder 705 adds $\Delta\theta_n$ a predetermined number of times. Since $\Delta\theta_i$ is added typically N times, going back from the current value $\Delta\theta_n$, the output thereof is expressed by:

$$\overline{\Delta\theta}_S = \frac{1}{N} \sum_{i=n-N+1}^{n} \Delta\theta_i \qquad (11)$$

This $\overline{\Delta\theta}_S$ is the average phase difference by the phase difference averaging method. A multiplexer 706 selects one of $\overline{\Delta\theta}_A$ and $\overline{\Delta\theta}_S$ by the same algorithm as that used for $\overline{\Delta\theta}_T$ and $\overline{\Delta\theta}_S$ in FIG. 2, as indicated between parentheses in FIG. 4. In this way it is possible to obtain an average phase difference having small errors, as indicated by the full line in FIG. 5, completely identically to the example indicated in FIG. 2.

FIG. 7 illustrates still another example of the average phase difference calculating circuit 7. The items represented by 701, 702 and 703 are identical to those indicated in FIG. 6 and thus the average phase difference $\overline{\Delta\theta}_A$ by the auto-correlation method can be obtained. The items represented by 704 and 705 are similarly a memory, in which arguments corresponding to the 2-axial components are stored, and an adder, respectively, similarly to FIG. 6. However, in this embodiment, since the memory 704 is read out not by the output of the auto-correlator 701 but by the output of the MTI filter 6, the difference between the phase $\theta_n$ of the Doppler signal at current time and the phase $\theta_{n-1}$ of the Doppler signal at the time preceding by one period is formed by an angle detector 720 to obtain $\Delta\theta_n$ and then these differences are added and averaged by an adder 705. $\overline{\Delta\theta}_S$ obtained in this way is the average phase difference by the phase difference averaging method. On the other hand, the output of the auto-correlator 701 is given to a memory, in which arguments corresponding to 2-axial components are stored, and in this way the phase difference $\Delta\theta_n$ is obtained. A variance operator executes a following operation, using values of N phase differences $\Delta\theta_i$ ($i = n-N+1, \ldots, n$) and the average phase difference $\overline{\Delta\theta}_A$ by the auto-correlation method obtained from the memory 703 to calculate the variation $\sigma_S$ of $\Delta\theta_i$;

$$\begin{aligned}\sigma_s &= \frac{1}{N} \sum_{i=n-N+1}^{n} (\Delta\theta_i - \overline{\Delta\theta}_A)^2 \\ &\quad \text{for } |\Delta\theta_i - \overline{\Delta\theta}_A| \leq \pi; \\ \sigma_s &= \frac{1}{N} \sum_{i=n-N+1}^{n} (|\Delta\theta_i - \overline{\Delta\theta}_A| - 2\pi)^2, \\ &\quad \text{for } |\Delta\theta_i - \overline{\Delta\theta}_A| > \pi.\end{aligned} \qquad (12)$$

Further, a power operator 723 calculates the average power of the phase vector signal, which has passed through the MTI filter 6 by using the following equation;

$$P_S = \sum_{i=n-N+1}^{n} (V_{Ri}^2 + V_{Ii}^2)^{1/2} \qquad (13)$$

A selector 724 selects either one of $\overline{\Delta\theta}_T$ and $\overline{\Delta\theta}_S$ according to the algorithm indicated in FIG. 8A, using the variance $\sigma_S$ and the value of the average power $P_S$ stated above, or determines not to output any phase difference signal because of mixing of noise. That is, (1) if the variance $\sigma_S$ is smaller than the threshold value $\sigma_C$, it compares the absolute value $|\overline{\Delta\theta}_A|$ of the average phase difference by the auto-correlation method with a predetermined angle $\theta_\alpha$ and if $|\overline{\Delta\theta_A}| < \theta_\alpha$, it selects the average phase difference $\overline{\Delta\theta}_S$ by the phase difference averaging method;

(2) if $\sigma_S < \sigma_C$ and $|\overline{\Delta\theta_A}| \geq \theta_\alpha$, it selects the average phase difference $\overline{\Delta\theta}_A$ by the auto-correlation method;

(3) if $\sigma_S \geq \sigma_C$, it compares the average power $P_S$ with a threshold value $P_n$ and if $P_S > P_n$, it selects similarly the average phase difference $\overline{\Delta\theta}_A$ by the auto-correlation method; and (4) if $\sigma_S \geq \sigma_C$ and $P_S \geq P_n$, phase difference output is zero.

66° or 86° is used for the value of $\sigma_C$. In the case where the MTI filter is of first order, $\sigma_C$ of about 76° is suitable. This value varies, depending on the order of the MTI filter 6. The angles in the region comprised between $\pi/3$ and $\pi/2$ (60° and 90°) are suitable for $\theta_\alpha$. $P_n$ is a threshold value determined after measuring the power of electric noise of the device, etc.

In this embodiment indicated in FIGS. 7 and 8 the measurement incapable region for the low speed region is similar to that of the embodiment indicated in FIGS. 2 and 6, and blood flow measurement having errors smaller than those by the prior art techniques is possible. In addition, when the value of the blood flow speed fluctuates, it is possible to judge whether fluctuations are produced by noise or a turbulent flow is really produced. Further the selection algorithm may be used for switching the 2-axial-component method and the phase difference averaging method.

FIG. 8B shows another algorithm used for selection in the selector 724 in FIG. 7. In this algorithm, the variance $\sigma_S$ is not use for selection. If the average power $P_S$ is larger than the threshold value $P_n$, $|\overline{\Delta\theta_A}|$ is compared to the threshold $\theta_\alpha$. Then, if $|\overline{\Delta\theta}| < \theta_\alpha$, $\overline{\Delta\theta}_S$ is selected as the output $\overline{\Delta\theta}$. If $|\overline{\Delta\theta}| \geq \theta_\alpha$, $\overline{\Delta\theta}_A$ is selected. If the power $P_S$ is not larger than $P_n$, 'zero' is selected as the output.

FIG. 9 shows still another embodiment of the average phase difference detecting circuit 7. The blocks indicated by the reference numerals 711 to 718 are the same items as those indicated in FIG. 2. Consequently the average phase difference $\overline{\Delta\theta}_T$ by the 2-axial component method is obtained from the memory 717 and on the other hand the average phase difference $\overline{\Delta\theta}_S$ by the phase difference average method is obtained. However, in this embodiment the value of $\overline{\Delta\theta}_T$ is used only for obtaining correction values to correct errors by the phase difference averaging method for a high speed region. When the adding and averaging operation in the adder 718 is effected at the neighborhood of $\pm\pi$, an angle correcting circuit 730 corrects the values, as if the adding operation were effected substantially at the neighborhood of angle zero, so as to remove the errors due to aliasing in the adder 718.

At first, the angle correcting circuit 730 judges whether the value of $\overline{\Delta\theta}_T$ is in a region $$-\frac{\pi}{4} \leq \overline{\Delta\theta}_T \leq \frac{\pi}{4}$$

or not. If it is in this region, since the output $\overline{\Delta\theta}_S$ of the adder 718 has no great errors, no correction is effected, but $\overline{\Delta\theta}_S$ is outputted, as it is, as the average phase difference $\overline{\Delta\theta}$.

If $$\overline{\Delta\theta}_T > \frac{\pi}{4} \text{ or } \overline{\Delta\theta}_T < -\frac{\pi}{4},$$

the angle correcting circuit 730 effects correction represented by the following equation, and after having effected the operation to add and average the angle in a right-handed new polar coordinate system, using the direction of $\overline{\Delta\theta}_T$ as the reference axis, effects substantially an operation to return the angles to those in the initial coordinate system;

$$\overline{\Delta\theta} = \overline{\Delta\theta}_S - \frac{S_g \cdot M \cdot 2\pi}{N} \quad (14)$$

where $S_g$ and M in Eq. (14) has the following values;
(1) if $\overline{\Delta\theta}_T > \pi/4$, $S_g = -1$ and M represents the number of phase differences $\Delta\theta_i$ among N, which satisfy $\Delta\theta_i < \overline{\Delta\theta}_T - \pi$; and
(2) if $\overline{\Delta\theta}_T < -\pi/4$, $S_g = +1$ and M represents the number of phase differences $\Delta\theta_i$ among N, which satisfy $\Delta\theta_i > \overline{\Delta\theta}_T + \pi$.

The correcting operation by Eq. (12) stated above can be explained, referring to FIGS. 10A and 10B. FIG. 10A indicates an operation, when $\overline{\Delta\theta}_T > \pi/4$. For the sake of simplicity it is supposed that the number of phase differences added in the adder 718 is 8 from $\Delta\theta_1$ to $\Delta\theta_8$. Since $\Delta\theta_1$ to $\Delta\theta_8$ are dispersed around $\overline{\Delta\theta}_T$, if the operation to add and average the angle is effected in the new polar coordinate system, which is right-handed with respect to the direction of $\overline{\Delta\theta}_T$ (indicated by chain-dotted lines in the figure), no errors due to aliasing are produced. The phase differences in this new polar coordinate system being denoted by $\Delta\theta'_i$ ($i=1, \ldots 8$), since the arithmetic average thereof is represented by $$\frac{1}{8} \sum_{i=1}^{8} \Delta\theta'_i,$$

the true average phase difference $\overline{\Delta\theta}$ returned to the original coordinate system is given by;

$$\overline{\Delta\theta} = \overline{\Delta\theta}_T - \frac{1}{8} \sum_{i=1}^{8} \Delta\theta'_i \quad (15)$$

$\Delta\theta_i$ can be expressed by using the following equations:

$$\begin{aligned} &\Delta\theta'_i = \overline{\Delta\theta}_T - \Delta\theta_i \\ &\text{where } \Delta\theta \geq \overline{\Delta\theta}_T - \pi, \\ &\Delta\theta'_i = \overline{\Delta\theta}_T - \Delta\theta_i - 2\pi \\ &\text{where } \Delta\theta_i < \overline{\Delta\theta}_T - \pi \end{aligned} \quad (16)$$

The number of $\Delta\theta_i$ satisfying $\Delta\theta_i < \overline{\Delta\theta}_T - \pi$ being denoted by M, substituting $\Delta\theta_i'$ in Eq. (15) by Eq. (16), the following equation is obtained:

$$\begin{aligned} \overline{\Delta\theta} &= \overline{\Delta\theta}_T - \frac{1}{8}\left\{ \sum_{i=1}^{8} [\overline{\Delta\theta}_T - \Delta\theta_i] - M \cdot 2\pi \right\} \\ &= \frac{1}{8}\left\{ \sum_{i=1}^{8} \Delta\theta_i + M \cdot 2\pi \right\} \\ &= \overline{\Delta\theta}_S + \frac{M \cdot 2\pi}{8} \end{aligned} \quad (17)$$

On the other hand, FIG. 10B indicates the case where $\overline{\Delta\theta}_T < -\pi/4$. Similarly to the case indicated in FIG. 10A, the number of $\Delta\theta'_i$ satisfying $\Delta\theta_i > \overline{\Delta\theta}_T + \pi$ being denoted by M, the true average phase difference $\overline{\Delta\theta}$ can be obtained by the following equation;

$$\overline{\Delta\theta} = \overline{\Delta\theta}_T - \frac{1}{8}\left\{ \sum_{i=1}^{8} [\overline{\Delta\theta}_T - \Delta\theta_i] + M \cdot 2\pi \right\} \quad (18)$$

$$= \frac{1}{8}\left\{ \sum_{i=1}^{8} \Delta\theta_i - M \cdot 2\pi \right\}$$

$$= \overline{\Delta\theta}_S - \frac{M \cdot 2\pi}{8}$$

Consequently, putting together Eqs. (17) and (18), denoting the number of phase differences generally by N, it can be understood that the true phase difference average value can be obtained by using Eq. (14).

Figure 11:
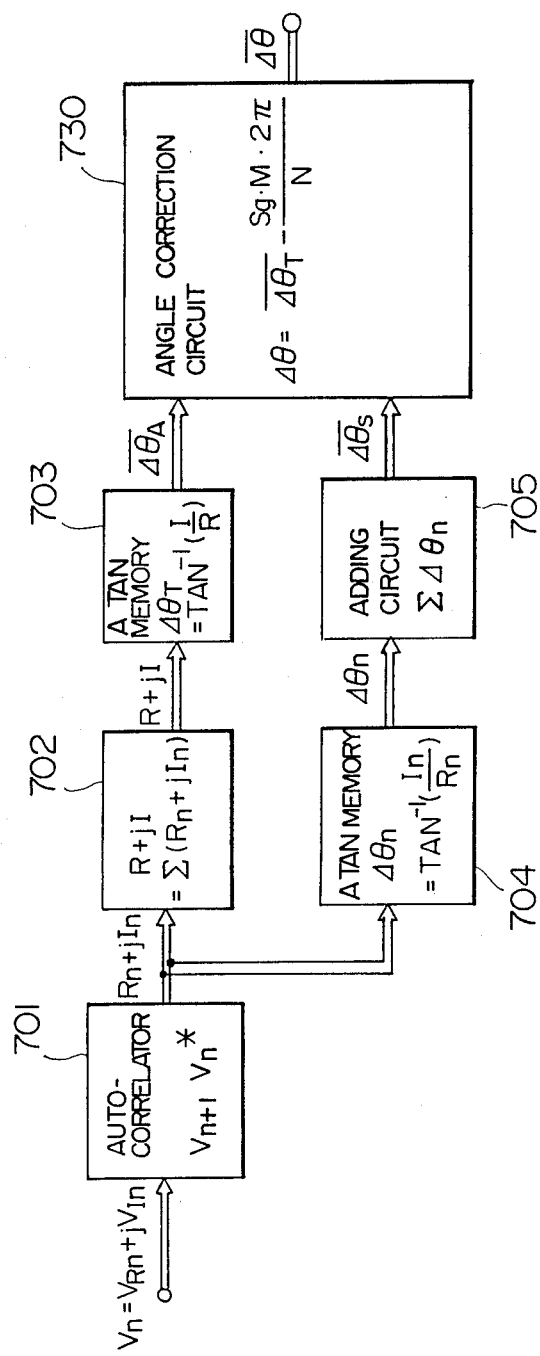

FIG. 11 shows still another example of the average phase difference detecting circuit 7. In this example, similarly to the example indicated in FIG. 9, the true average phase difference $\overline{\Delta\theta}$ is obtained by correcting the errors produced at the adding and the averaging by the phase difference averaging method in the high speed region. However the correction values are calculated by using the auto-correlation method. Reference numerals 701, 702, 703, 704 and 705 represent the same items as those indicated in FIG. 3. The angle correcting circuit 730 is the same as that indicated in FIG. 9 and effects the correction operation explained, referring to FIGS. 10A and 10B. However, for calculating the correction values not $\overline{\Delta\theta}_T$ but $\overline{\Delta\theta}_A$ read out from the memory 703 is used.

By using the average phase difference calculating circuit indicated in FIG. 9 or 11, since errors in the high speed region by the phase difference averaging method are corrected, a blood flow speed measurement having small errors can be effected in a wide speed region. Further, by the auto-correlation method or the 2-axial-component method, when the number of phase difference detection values used for the average phase difference calculation is N, the improvement in the signal to noise ratio is $\sqrt{N}$ times, whereas by the phase difference averaging method it is $N/\sqrt{2}$ times. Consequently, blood flow measurement of lower noise is possible.

FIG. 12 shows still another embodiment of this invention and indicates the parts replacing those indicated by the reference numerals 4, 5, 6, 7 and 8 in FIG. 1. The phase comparator 4 and the A/D converter 5 are identical to those indicated in FIG. 1. An MTI filter 6-1 obtains a phase vector $V_n$ expressed by $$V_n = V'_n - V'_{n-1} \quad (19)$$

in which the signals from the fixed substance is removed, by using the difference between the Doppler signal $V'_n$ obtained at current time point and the Doppler signal obtained at the time preceding by one time period, i.e. preceding the Doppler signal $V'_n$ by a transmission interval T. Reference numerals 701-1, 702-1 and 703-1 indicate items identical to those indicated by 701, 702 and 703 in FIG. 6, respectively, and in this way the average phase difference $\overline{\Delta\theta}_A$ by the auto-correlation method can be obtained.

On the other hand an MTI filter 6-2 calculates a phase vector $V_n$ expressed by;

$$U_n = V'_n - V'_{n-2} \quad (20)$$

by using the difference between the Doppler signal $V'_n$ obtained at current time point and the Doppler signal $V'_{n-1}$ obtained at the time preceding by two time periods, i.e. preceding the Doppler signal $V'_n$ by 2T.

An auto-correlation 701-2 calculates a complex product $X_n$ of a phase vector $U_n$ at current time point by the conjugate complex vector $U_{n-2}*$ of the phase vector $U_{n-2}$ preceding it by two periods among the phase vectors obtained one after another with a period T. $X_n$ is indicated as follows.

$$X_n = U_n \cdot U_{n-2}* \quad (20')$$

An adder 702-2 adds N−1 vectors $X_n$, going back from current time point to obtain a sum vector. The result of the calculation can be expressed by:

$$R' + jI' = \sum_{i=n-N+2}^{n} U_i \cdot U_{i-2}* \quad (21)$$

When the real part R' and the imaginary part I' of this sum vector is given to an angle detecting memory 703-2 as addresses, the argument $\overline{\Delta\theta}_A$ of this sum vector expressed by the following equation is read out;

$$\overline{\Delta\theta}'_A = \tan^{-1}\left(\frac{I'}{R'}\right) \quad (22)$$

$\overline{\Delta\theta}_A$ obtained by the ATAN memory 703-1 stated above is a phase difference obtained by the correlation with the interval T of the phase vectors sampled successively with the interval T and corresponds to the Doppler phase shift during the time parameter T. Further $\overline{\Delta\theta}_A'$ obtained by the angle detecting memory 703-2 is a phase difference obtained by the correlation with the interval 2T of the phase vectors stated above and corresponds to the Doppler phase shift during the time parameter 2T. Consequently Doppler frequences $\omega_d$ and $\omega_d'$ are obtained by the following operations by dividers 8-1 and 8-2, respectively;

$$\omega_d = \overline{\Delta\theta}_A/T \quad (24)$$

$$\omega_d' = \overline{\Delta\theta}'_A/2T \quad (25)$$

Now, when the frequency characteristics of the MTI filters 6-1 and 6-2 are compared with each other, it can be seen that the transfer gain of the MTI filter 602 is greater than that of the MTI filter 6-1 in the low speed region, as indicated in FIG. 13. Further, since the phase difference indicated by the argument of the output $X_n$ of the auto-correlator 701-2 is twice as great as that of the output $Y_n$ of the auto-correlator 701-1 for a same blood flow speed, $\omega_d'$ is measured with a higher precision than $\omega_d$. However the measurement limit is $\pm\pi/T$ for $\omega_d$ and $\pm\pi/2T$ for $\omega_d'$. Therefore a discriminator compares the absolute value $|\overline{\Delta\theta}_A|$ of $\Delta\theta_A$ with a threshold value $\theta_k$ and if $|\overline{\Delta\theta}_A| < \theta_k$, it selects $\omega_d'$. On the other hand, if $|\overline{\Delta\theta}_A| \geq \theta_k$, it selects $\omega_d$ to output it to a display as a measured value for the blood flow velocity. It is desirable that the value of $\theta_k$ is equal to or slightly smaller than $\pi/2$.

Figure 14:
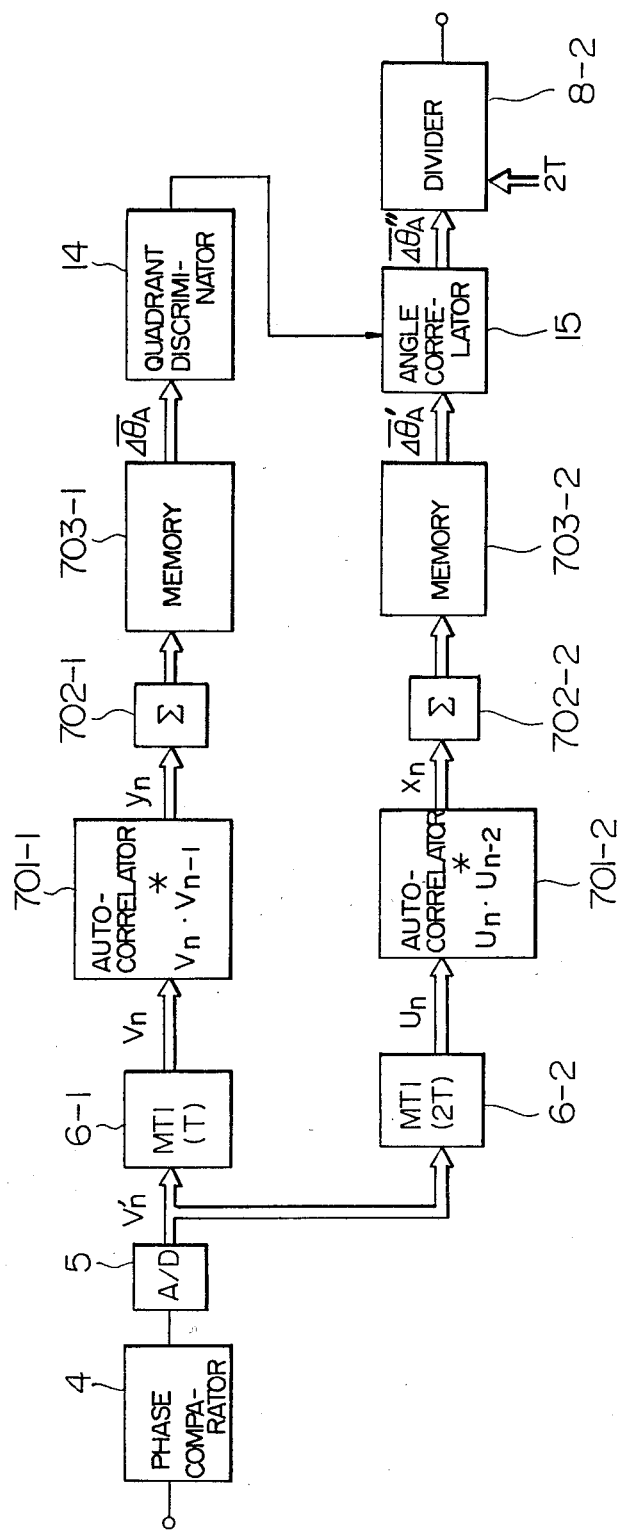

FIG. 14 shows still another embodiment. The construction of the parts indicated by 6-1, 6-2, 701-1, 701-2, 702-1, 702-2, 703-1 and 703-2 are completely identical to the corresponding parts in FIG. 12. That is, the average value $\overline{\Delta\theta}_A$ of the phase difference corresponding to the time parameter T is obtained from the angle detector 703-1 and the average value $\overline{\Delta\theta'}_A$ of the phase difference corresponding to the time parameter 2T is obtained from the angle detector 703-2. The output $\overline{\Delta\theta}_A$ is used not for obtaining the Doppler frequency, but for correcting ambiguity corrections of the value of $\overline{\Delta\theta'}_A$ in the high speed region. That is, a quadrant discriminator 14 judges, in which quadrant the value of $\Delta\theta_A$ is, $|\overline{\Delta\theta}_A| \leq \theta_{L1}$, $\theta_{L2} > \overline{\Delta\theta}_A > \theta_{L1}$, $-\theta_{L2} < \overline{\Delta\theta}_A < -\theta_{L1}$; or $|\overline{\Delta\theta}_A| \geq \theta_{L2}$. Where, $\theta_{L1}$ equal $\pi/2$, and $\theta_{L2}$ is a threshold angle at which the spectral characteristics of MTI filter 6-1 is a little higher than that of MTI filter 6-2. Typically, $\theta_{L2}$ is about $3\pi/4$ at which the spectral characteristics of MTI filter 6-1 is 3 dB higher than that of MTI filter 6-2. An angle corrector 15 uses the judgement result of the quadrant discriminator 14 to correct the value of $\overline{\Delta\theta'}_A$ as follows:

$$\left.\begin{array}{l}\overline{\Delta\theta''}_A = \overline{\Delta\theta'}_A, \text{ if } |\overline{\Delta\theta'}_A| \leq \theta_{L1} \\ \overline{\Delta\theta''}_A = \overline{\Delta\theta'}_A + 2\pi, \text{ if } \theta_{L2} > \overline{\Delta\theta'}_A > \theta_{L1} \\ \overline{\Delta\theta''}_A = \overline{\Delta\theta'}_A - 2\pi, \text{ if } -\theta_{L2} < \overline{\Delta\theta}_A > -\theta_{L1} \\ \overline{\Delta\theta''}_A = 2 \cdot \overline{\Delta\theta}_A, \text{ if } |\overline{\Delta\theta'}_A| \geq \theta_{L2}\end{array}\right\} \quad (26)$$

A divider 802 uses the average phase difference $\overline{\Delta\theta''}_A$ corrected, depending on the value of $\overline{\Delta\theta}_A$ as described above, to obtain the Doppler frequency $\omega_d$, using the following equation:

$$\omega_d = \frac{\overline{\Delta\theta}_A''}{2T} \quad (27)$$

As described above, in FIG. 12 or 14, errors by the auto-correlation method in the low speed region are reduced by combining the average phase difference detection by the auto-correlation method using the time parameter T with the average phase difference detection using the time parameter 2T. Generally the time parameters not T and 2T but T and nT (n being an integer not smaller than 2) may be combined. At this time, by the method indicated in FIG. 12, the threshold value $\theta_k$ used for the discrimination may be equal to or slightly smaller than $\pi/n$. On the other hand, by the method indicated in FIG. 14, the threshold angle $\theta_{L1}$ in Eq. (26) becomes $\pi/n$ and the threshold angle $\theta_{L2}$ becomes about $3\pi/2n$. It is possible further to reduce errors to a lower speed region by combining more than 2 time parameters such as T, 2T and 4T, etc. Further, the MTI filters 6-1 and 6-2 in FIGS. 12 and 14 may be constructed, unified in one MTI filter 6-3, as indicated in FIG. 15. That is, delaying elements 65 and 66, each of which has a delay time T, are connected in cascade and the Doppler signal $V_n'$ is inputted through the input thereof. A subtracting element 67 forms the difference between the value on the input side and that on the output side of the delaying element 65 to obtain the phase vector $V_n$ expressed by Eq. (19). On the other hand another subtracting element 68 forms the difference between the value on the input side of the delaying element 65 and the value on the output side of the delaying element 66 to obtain the phase vector $U_n$ expressed by Eq. (20).

We claim:

1. An ultrasonic pulse Doppler flow meter comprising:
    transmitter-receiver means for transmitting ultrasonic pulsed continuous wave towards an object with a predetermined interval and receiving wave reflected by said object to obtain a reception signal;
    phase detecting means for generating a phase vector indicating the phase of said reception signal, each time said reception signal is obtained;
    first average phase difference calculating means for obtaining the phase difference $\Delta\theta$ between the phase vector at current time point and the phase vector at the time preceding by one time period, each time said phase vector is obtained, decomposing it into a cosine component and a sine component, and calculating the angle represented by the average of a plurality of cosine components and the average of a plurality of sine components as a first average phase difference;
    second average phase difference calculating means for adding said phase difference $\Delta\theta$ a plurality of times to obtain the average thereof as a second average phase difference; and
    selecting means for selecting one of said first and said second average phase difference, depending on the magnitude of the speed of said object, as a signal indicating the speed of said object.

2. An ultrasonic pulse Doppler flow meter according to claim 1, wherein said selecting means selects the output of said second average phase difference calculating means when the absolute value of the output of said first average phase difference calculating means is smaller than a predetermined angle and the output of said first average phase difference calculating means when said absolute value is greater than said predetermined angle.

3. An ultrasonic pulse Doppler flow meter according to claim 2, wherein said predetermined angle is in a region comprised between $\pi/3$ and $\pi/2$.

4. An ultrasonic pulse Doppler flow meter according to claim 1, further comprising means for obtaining successively the speed indicated by said phase difference $\Delta\theta$ to calculate the variation of the speed and means for obtaining the intensity of said reflection signal, said selecting means using said variation of the speed and said intensity of the reflection signal in addition to the output of said first phase difference detecting means as parameters for the selection of the phase difference.

5. An ultrasonic pulse Doppler flow meter according to claim 4, wherein when said variation of the speed exceeds a predetermined value and said intensity of the reflection signal is smaller than a predetermined value, the speed is judged to be impossible to measure or zero.

6. An ultrasonic pulse Doppler flow meter according to claim 1, wherein said selecting means select one of said first and said average phase difference when an average power of said phase vector is larger than a threshold value, and select 'zero' when said average power is not larger than said threshold value.

7. An ultrasonic pulse Doppler flow meter comprising:
    transmitter-receiver means for transmitting ultrasonic pulsed continuous wave towards an object with a predetermined interval and receiving wave reflected by said object to obtain a reception signal;
    phase detecting means for generating a phase vector indicating the phase of said reception signal, each time said reception signal is obtained;

first average phase difference calculating means for obtaining the phase difference $\Delta\theta$ between the phase vector at current time point and the phase vector at the time preceding by one time period, each time said phase vector is obtained, decomposing it into a cosine component and a sine component, and calculating the angle represented by the average of a plurality of cosine components and the average of a plurality of sine components as a first average phase difference;

second average phase difference calculating means for adding arguments of said phase difference vector to obtain the average thereof as a second average phase difference; and selecting means for selecting one of said first and said second average phase difference, depending on the magnitude of the speed of said object, as a signal indicating the speed of said object.

8. An ultrasonic pulse Doppler flow meter according to claim 7, wherein said selecting means selects the output of said second average phase difference calculating means when the absolute value of the output of said first average phase difference calculating means is smaller than a predetermined angle and the output of said first average phase difference calculating means when said absolute value is greater than said predetermined angle.

9. An ultrasonic pulse Doppler flow meter according to claim 8, wherein said predetermined angle is in a region comprised between $\pi/3$ and $\pi/2$.

10. An ultrasonic pulse Doppler flow meter according to claim 7, further comprising means for obtaining successively the speed indicated by said phase difference $\Delta\theta$ to calculate the variation of the speed and means for obtaining the intensity of said reflection signal, said selecting means using said variation of the speed and said intensity of the reflection signal in addition to the output of said first phase difference detecting means as parameters for the selection of the phase difference.

11. An ultrasonic pulse Doppler flow meter according to claim 10, wherein when said variation of the speed exceeds a predetermined value and said intensity of the reflection signal is smaller than a predetermined value, the speed is judged to be impossible to measure or zero.

12. An ultrasonic pulse Doppler flow meter according to claim 7, wherein said selecting means select one of said first and said average phase difference when an average power of said phase vector is larger than a threshold value, and select 'zero' when said average power is not larger than said threshold value.

13. An ultrasonic pulse Doppler flow meter comprising:

transmitter-receiver means for transmitting ultrasonic pulsed continuous wave towards an object with a predetermined interval and receiving wave reflected by said object to obtain a reception signal;

phase detecting means for generating a phase vector indicating the phase of said reception signal each time said reception signal is obtained;

first average phase difference calculating means for obtaining the phase difference $\Delta\theta$ between the phase vector at current time point and the phase vector at the time preceding by one time period, each time said phase vector is obtained, decomposing it into a cosine component and a sine component, and calculating the angle represented by the average of a plurality of cosine components and the average of a plurality of sine components as a first average phase difference;

second average phase difference calculating means for adding said phase difference $\Delta\theta$ a plurality of times to obtain the average thereof as a second average phase difference; and correcting means for correcting said second average phase difference, using said first average phase difference, so that the addition and averaging in said second average phase difference calculating means is substantially effected by using the angle of said first average phase difference as the reference axis for the angle, wherein the average phase difference corrected by said correcting means is adopted as the signal indicating the speed of said object.

14. An ultrasonic pulse Doppler flow meter according to claim 13, wherein the correction by means of said correcting means is effected, when the absolute value of said first average phase difference exceeds a predetermined threshold value.

15. An ultrasonic pulse Doppler flow meter comprising:

transmitter-receiver means for transmitting ultrasonic pulsed continuous wave towards an object with a predetermined interval and receiving wave reflected by said object to obtain a reception signal;

phase detecting means for generating a phase vector indicating the phase of said reception signal, each time said reception signal is obtained;

first average phase difference calculating means for obtaining the phase difference $\Delta\theta$ between the phase vector at current time point and the phase vector at the time preceding by one time period, each time said phase vector is obtained, decomposing it into a cosine component and a sine component, and calculating the angle represented by the average of a plurality of cosine components and the average of a plurality of sine components as a first average phase difference;

second average phase difference calculating means for adding arguments of said phase difference vector to obtain the average thereof as a second average phase difference; and correcting means for correcting said second average phase difference, using said first average phase difference, so that the addition and averaging in said second average phase difference calculating means is substantially effected by using the angle of said first average phase difference as the reference axis for the angle, wherein the average phase difference corrected by said correcting means is adopted as the signal indicating the speed of said object.

16. An ultrasonic pulse Doppler flow meter according to claim 15, wherein the correction by means of said correcting means is effected, when the absolute value of said first average phase difference exceeds a predetermined threshold value.

17. An ultrasonic pulse Doppler flow meter comprising:

transmitter-receiver means for transmitting ultrasonic pulsed continuous wave towards an object at predetermined intervals T and receiving wave reflected by said object to obtain a reception signal;

phase detecting means for detecting the phase of said reception signal and generating phase vectors sampled at said intervals T;

first auto-correlating means for obtaining a first phase difference vector by correlating phase vectors having said interval T therebetween among said phase vectors sampled at said intervals T to calculate the argument thereof;

second auto-correlating means for obtaining a second phase difference vector by correlating phase vectors having an interval nT (n being an integer not smaller than 2) therebetween among said phase vectors sampled at said intervals T to calculate the argument thereof; and selecting means for selecting the argument of said first phase difference vector for a high speed region and the argument of said second phase difference vector for a low speed region to obtain a signal indicating the speed of said object.

18. An ultrasonic pulse Doppler flow meter according to claim 17, wherein said selecting means selects the argument of said second phase difference vector when the absolute value of the argument of said first phase difference vector is smaller than a threshold value, which is equal to or slightly smaller than $\pi/n$, and the argument of said first phase difference vector when the absolute value of the argument of said first phase difference vector is greater than said threshold value.

19. An ultrasonic pulse Doppler flow meter comprising:

transmitter-receiver means for transmitting ultrasonic pulsed continuous wave towards an object at predetermined intervals T and receiving wave reflected by said object to obtain a reception signal;

phase detecting means for detecting the phase of said reception signal and generating phase vectors sampled at said intervals T;

first auto-correlating means for obtaining a first phase difference vector by correlating phase vectors having said interval T therebetween among said phase vectors sampled at said intervals T to calculate the argument thereof;

second auto-correlating means for obtaining a second phase difference vector by correlating phase vectors having an interval nT (n being an integer not smaller than 2) therebetween among said phase vectors sampled at said intervals T to calculate the argument thereof; and correcting means for judging in which region the argument of said first phase difference vector is among angular regions devided by $\pm\theta_{L1}$ and $\pm\theta_{L2}$, wherein $\theta_{L1}$ is $\pi/n$ and $\theta_{L2}$ is an angle at which spectral characteristics of said first auto-correlation means is a little higher than that of said second auto-correlation means, and effecting corrections on the argument of said second phase difference vector, depending on the judgement result to obtain a signal indicating the speed of said object.

* * * * *

UNITED STATES PATENT AND TRADEMARK OFFICE
CERTIFICATE OF CORRECTION

PATENT NO. : 4,905,206

DATED : February 27, 1990

INVENTOR(S) : Gene F. Day

It is certified that error appears in the above-identified patent and that said Letters Patent is hereby corrected as shown below:

Column 1, line 10, "ACT" should read - - ART - -.

Column 1, line 11, "An" should read - - In - -.

Column 4, line 22, "extend" should read - - extends - -.

Claim 18, column 9, line 25, "claim 16 said plenum" should read
    - - claim 16 wherein said plenum - - .

Signed and Sealed this

Twenty-sixth Day of March, 1991

*Attest:*

HARRY F. MANBECK, JR.

*Attesting Officer*      *Commissioner of Patents and Trademarks*